United States Patent
Hayashi et al.

(10) Patent No.: US 6,561,926 B2
(45) Date of Patent: *May 13, 2003

(54) GOLF BALL

(75) Inventors: Junji Hayashi, Chichibu (JP); Yutaka Masutani, Chichibu (JP); Hisashi Yamagishi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/929,107

(22) Filed: Aug. 15, 2001

(65) Prior Publication Data

US 2003/0004014 A1 Jan. 2, 2003

(30) Foreign Application Priority Data

Jun. 19, 2001 (JP) ........................................ 2001-185470

(51) Int. Cl.$^7$ ............................................... A63B 37/06
(52) U.S. Cl. ....................................... 473/372; 473/377
(58) Field of Search ................................ 473/377, 378, 473/376, 371, 372, 351

(56) References Cited

U.S. PATENT DOCUMENTS

| | | | | |
|---|---|---|---|---|
| 4,911,451 A | * | 3/1990 | Sullivan et al. | 260/998.14 |
| 5,068,151 A | * | 11/1991 | Nakamura | 428/407 |
| 5,298,571 A | * | 3/1994 | Statz et al. | 260/998.14 |
| 5,490,673 A | * | 2/1996 | Hiraoka | 473/372 |
| 5,776,012 A | * | 7/1998 | Moriyama et al. | 473/372 |
| 6,386,993 B1 | * | 5/2002 | Yokota | 473/373 |

FOREIGN PATENT DOCUMENTS

| | | | | |
|---|---|---|---|---|
| GB | 2338421 A | * | 12/1999 | A63B/37/00 |

* cited by examiner

Primary Examiner—Mark S. Graham
Assistant Examiner—Raeann Gorden
(74) Attorney, Agent, or Firm—Sughrue Mion, PLLC

(57) ABSTRACT

A golf ball includes a core made from a rubber composition containing polybutadiene as a main rubber component and also an organic sulfur compound; and a cover made from a cover material mainly containing an ionomer resin composed of an Li ion neutralized type ionomer resin and a Mg ion neutralized ionomer resin, and also an inorganic filler having a specific gravity of 3.50 or more. A flexural amount of the core, measured by applying a load of 980 N thereto, is in a range of 4.0 to 5.5 mm. A specific gravity of the cover material is in a range of 1.020 to 1.110, and a Shore D hardness of the cover is in a range of 55 to 65. Such golf ball exhibits high durability and very high resilience.

13 Claims, 2 Drawing Sheets

GOLF BALL

BACKGROUND OF THE INVENTION

The present invention relates to a golf ball with high durability and very high resilience.

A method of improving a cover material by adding an inorganic filler (titanium dioxide and barium sulfate) thereto has been proposed, for example, in Japanese Patent Laid-open No. Hei 6-277312. The addition of titanium dioxide and barium sulfate to the cover of a golf ball is effective to give excellent properties such as a carrying performance to the golf ball. With respect to the reason for this, the document describes that the addition of titanium dioxide and barium sulfate to the cover "shifts a weight distribution in the ball from the core center to the cover side, to increase an inertia moment of the ball, thereby increasing the carry of the golf ball".

Such a proposal, however, has been required to be further improved in terms of factors determining golf ball performances, for example, a hardness factor of the cover and core, a composition factor of the cover and core, and a dimple factor. In particular, the ball disclosed in the embodiment of the above proposal has been required to be improved in terms of feeling of hitting the ball and the carry of the ball.

On the other hand, the properties of a golf ball strongly demanded by golf players are generally player's soft feeling at the time of hitting the ball and the carrying performance of the ball; however, it is regarded as difficult to make both the properties compatible with each other for the following reasons:

(1) If the core is softened for ensuring the player's soft feeling, a deformed amount of the hit ball becomes large, to degrade the durability against cracking.

(2) If both the core and cover are softened for ensuring both the player's soft feeling and durability against cracking, the resilience and initial velocity of the ball are reduced, to sacrifice the carrying performance.

(3) If the ball is excessively improved only in terms of the player's soft feeling, the other properties are sacrificed, to cause such an inconvenience that local deformation of the hit ball becomes large, not to keep the sphericalness of the ball at the initial stage of the carry of the ball, thereby degrading the carrying performance.

To solve the above problems, Japanese Patent Laid-open No. 2000-5341 has proposed an excellent golf ball characterized by combining a core, which is softened to improve the player's soft feeling and durability against cracking, with a cover to which a reinforcement filler is added.

Such a golf ball, however, has been required to be further improved in terms of resilience.

SUMMARY OF THE INVENTION

An object of the present invention is to provide a golf ball with high durability and very high resilience.

As a result of an examination made, by the present inventor, to achieve the above object, it has been found that a golf ball including: a core made from a rubber composition containing polybutadiene as a main rubber component and also an organic sulfur compound; and a cover made from a cover material mainly containing an ionomer resin composed of an Li ion neutralized type ionomer resin and a Mg ion neutralized ionomer resin, and also an inorganic filler having a specific gravity of 3.50 or more; wherein a flexural amount of the core, measured by applying a load of 980 N thereto, is in a range of 4.0 to 5.5 mm; and a specific gravity of the cover material is in a range of 1.020 to 1.110, and a Shore D hardness of the cover is in a range of 55 to 65, is advantageous in improving the productivity and exhibiting excellent properties as described below by a synergism effect of the above-described optimized requirements.

(1) Since the specific gravity of an inorganic filler is optimized, it is possible to improve the durability and prevent degradation of the resilience (carrying performance).

(2) Since an ionomer resin composed of two kinds of ionomer resins of specific metal ion neutralized types is used, it is possible to further improve the resilience (carrying performance) and the carry of the ball.

(3) Since the core is made from a material containing an organic sulfur compound, it is possible to improve the resilience.

The present inventor has further found that the carrying performance of the above-described golf ball is further improved by optimizing dimples of the golf ball as follows:

(4) If a ball is relatively soft, the spin of the hit ball becomes small, and therefor, if the ballistic path of the ball is excessively low, the carry of the ball may become insufficient because of the "drop" of the ball. To cope with such an inconvenience, the dimple total volume ratio (VR) is specified, to prevent the "drop" of the ball, thereby ensuring a high carrying performance.

The present invention has been accomplished on the basis of the above-described knowledge.

According to the present invention, there is provided a golf ball including: a core made from a rubber composition containing polybutadiene as a main rubber component and also an organic sulfur compound; and a cover made from a cover material mainly containing an ionomer resin composed of an Li ion neutralized type ionomer resin and a Mg ion neutralized ionomer resin, and also an inorganic filler having a specific gravity of 3.50 or more; wherein a flexural amount of the core, measured by applying a load of 980 N thereto, is in a range of 4.0 to 5.5 mm; and a specific gravity of the cover material is in a range of 1.020 to 1.110, and a Shore D hardness of the cover is in a range of 55 to 65.

In the above golf ball, preferably, a flexural amount of the golf ball, measured by applying a load of 980 N thereto, is in a range of 3.2 to 4.5 mm.

The inorganic filler preferably contains at least barium sulfate, and a content of the inorganic filler is in a range of 10 to 25 parts by mass on the basis of 100 parts by mass of the ionomer resin.

A thickness of the cover is preferably in a range of 1.0 to 2.0 mm.

A content of the organic sulfur compound is preferably in a range of 0.05 to 3.00 parts by mass on the basis of 100 parts by mass of the main rubber component.

Further, in the above golf ball, preferably, the golf ball has in the cover surface a large number of dimples; and a dimple total volume ratio (VR) is in a range of 0.85% or less, the dimple total volume ratio being defined as a ratio of a total volume of dimple spaces each of which is present under a plane surface surrounded by an edge portion of the dimple to a total volume of a virtual ball being the same as the golf ball except that the virtual ball has no dimples.

DETAILED DESCRIPTION OF THE PREFERRED EMBODIMENTS

Figure 1:
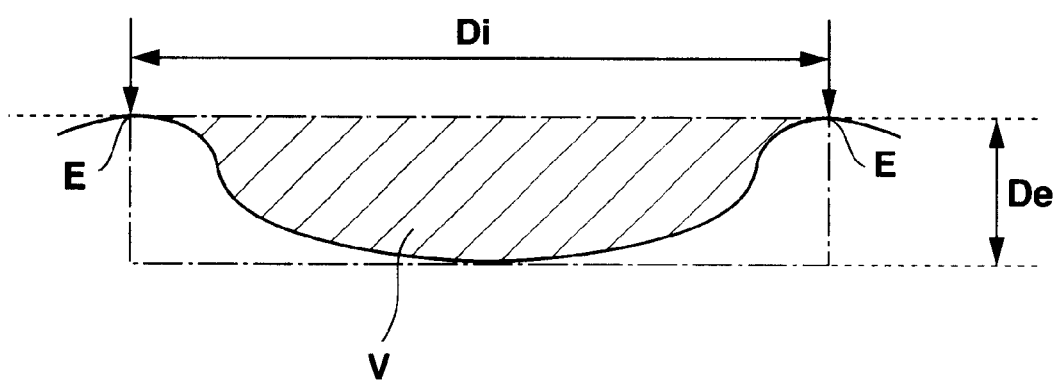
FIG. 1 is a sectional view of one dimple of a golf ball illustrating the definition of a dimple total volume ratio (VR).
Figure 2:
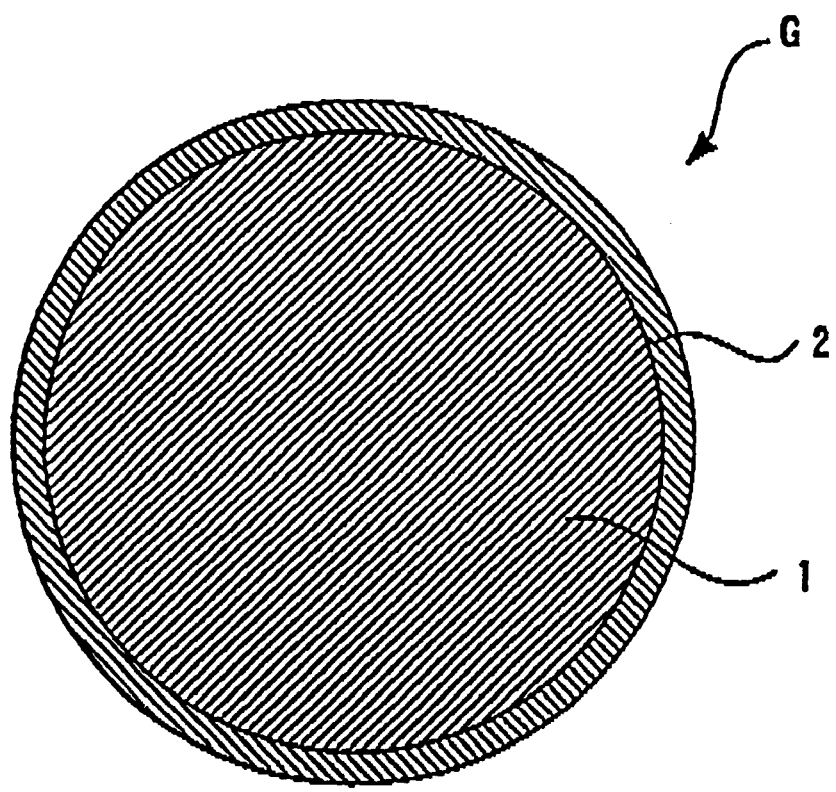
FIG. 2 is a sectional view of a golf ball of the present invention having a core and a cover.

The present invention will be hereinafter described in more detail with reference to FIGS. 1 and 2. A golf ball G of the present invention includes a solid core 1 and a cover 2. The solid core is made from a rubber composition containing polybutadiene as a main rubber component and also an organic sulfur compound as an essential component.

Concretely, cis-1,4-polybutadiene may be used as polybutadiene as the main rubber component of the rubber composition.

In addition to polybutadiene, another diene based rubber, such as styrene-butadiene rubber (SBR), natural rubber, isoprene rubber, or ethylene-propylene-diene rubber (EPDM) may be suitably mixed in the above base rubber.

The solid core of the present invention contains an organic sulfur compound as an essential component for significantly improving the resilience thereof.

Examples of the organic sulfur compounds may include thiophenol, thionaphthol, halogenated thiophenol, or metal salts thereof, more concretely, zinc salts of pentachlorothiophenol, pentafluorothiophenol, pentabromothiophenol, and parachlorothiophenol; and diphenyl polysulfide, dibenzil polysulfide, dibenzoil polysulfide, dibenzothiazoil polysulfide, and dithiobenzoil polysulfide, each of which has the sulfur number of 2 to 4. In particular, a zinc salt of pentachlorothiophenol or diphenyl disulfide is preferably used.

According to the present invention, the content of the organic sulfur compound may be set, on the basis of 100 parts by mass of the main rubber component, in a range of 0.05 part by mass or more, preferably, 0.10 part by mass or more, more preferably, 0.20 part by mass or more, with the upper limit being in a range of 3.00 parts by mass or less, preferably, 2.50 parts by mass or less, more preferably, 2.00 parts by mass or less. If the content is excessively small, the resilience is not improved, and if excessively large, the hardness and strength of the core are reduced, and further it may take a lot of time to mold the rubber composition.

In addition to the above-described main rubber component and organic sulfur compound, unsaturated carboxylic acid and/or a metal salt thereof and an organic peroxide can be added to the rubber composition of the solid core of the present invention.

Examples of the unsaturated carboxylic acids may include acrylic acid, metacrylic acid, maleic acid, fumaric acid. In particular, acrylic acid and metacrylic acid are preferably used.

Examples of the metal salts of unsaturated carboxylic acids may include zinc salts and magnesium salts of unsaturated aliphatic acids, for example, zinc metacrylate and zinc acrylate. In particular, zinc acrylate is preferably used.

The content of the unsaturated carboxylic acid and/or metal salt thereof may be set, on the basis of 100 parts by mass of the main rubber component, in a range of 10 parts by mass or more, preferably, 15 parts by mass or more, more preferably, 20 parts by mass or more, with the upper limit being in a range of 50 parts by mass or less, preferably, 45 parts by mass or less, more preferably, 40 parts by mass or less, most preferably, 35 parts by mass or less. If the content is excessively small, the resilience is reduced, and if excessively large, the solid core becomes excessively hard, which may sometimes make player's feeling of hitting of the golf ball undesirable.

As the organic peroxide, there can be used a commercial product such as "Percumyl D" (sold by NOF CORPORATION), "Perhexa 3M" (sold by NOF CORPORATION), "Luperco 231XL" (sold by Elf Atochem Japan). Two kinds or more organic peroxides may be used in combination as needed.

The content of the organic peroxide may be set, on the basis of 100 parts by mass of the main rubber component, in a range of 0.1 part by mass or more, preferably, 0.3 part by mass or more, more preferably, 0.5 part by mass or more, with the upper limit being in a range of 5 parts by mass or less, preferably, 4 parts by mass or less, more preferably, 3 parts by mass or less, most preferably, 2 parts by mass or less. If the content is excessively large or small, the resilience, player's feeling of hitting the golf ball, and durability against cracking may be reduced.

In addition to the above-described essential components, an inorganic filler can be added to the rubber composition of the present invention for adjusting the specific gravity, as needed. Examples of the inorganic fillers may include zinc oxide, barium sulfate, and calcium carbonate. In order to obtain a suitable weight and desirable resilience, the content of the inorganic filler may be set, on the basis of 100 parts by mass of the main rubber component, in a range of 1 part by mass or more, preferably, 3 parts by mass or more, more preferably, 5 parts by mass or more, most preferably, 7 parts by mass or more, with the upper limit being in a range of 60 parts by mass or less, preferably, 50 parts by mass or less, more preferably, 45 parts by mass or less, most preferably, 40 parts by mass or less.

An antioxidant may be further added to the rubber composition of the present invention, as needed. As the antioxidant, there can be used a commercial product such as "NOCRAC NS-6, NS-30" (sold by Ouchi-Sinko Chemical Industrial Co., Ltd.), or "Yoshinox 425" (Yoshitomi Pharmaceutical Co., Ltd.). In order to obtain desirable resilience and durability, the content of the antioxidant may be set, on the basis of 100 parts by mass of the main rubber component, in a range of 0 part by mass or more, preferably, 0.05 part by mass or more, more preferably, 0.1 part by mass or more, most preferably, 0.2 part by mass or more, with the upper limit being in a range of 3 parts by mass or less, preferably, 2 parts by mass or less, more preferably, 1 part by mass or less, most preferably, 0.5 part by mass or less.

The solid core of the present invention can be formed by vulcanizing and heating the above-described rubber composition by a known process. For example, a vulcanizing temperature may be set in a range of 100 to 200° C., and a vulcanizing time be set in a range of 10 to 40 min.

According to the present invention, the hardness of the solid core, which is expressed in a flexural amount, that is, a deformed amount of the solid core measured by applying a load of 980 N (100 kg) thereto, may be set in a range of 4.0 mm or more, preferably, 4.2 mm or more, more preferably, 4.6 mm or more, with the upper limit being in a range of 5.5 mm or less, preferably, 5.3 mm or less, more preferably, 5.2 mm or less. If the flexural amount, that is, the flexural amount is excessively small, player's feeling of hitting the golf ball becomes harder, and particularly, the spin of the ball becomes excessively high at the time of long-shot with a driver when the ball is liable to be largely deformed, to reduce the carry of the ball, and if excessively large, player's feeling of hitting the ball becomes dull, the carry of the ball is reduced because of insufficient resilience, and durability against cracking due to repeated hitting is degraded.

The diameter of the solid core of the present invention may be set in a range of 38.0 mm or more, preferably, 38.5 mm or more, more preferably, 38.7 mm or more, most preferably, 38.9 mm or more, with the upper limit being in a range of 41.0 mm or less, preferably, 40.7 mm or less, more preferably, 40.3 mm or less, most preferably, 40.1 mm or less.

The specific gravity of the solid core may be set in a range of 1.000 or more, preferably, 1.050 or more, more preferably, 1.100 or more, with the upper limit being in a range of 1.300 or less, preferably, 1.250 or less, more preferably, 1.200 or less.

The golf ball of the present invention is a solid golf ball including the above-described solid core and a cover. Such a solid golf ball may be any one of a two-piece type including one cover layer and a multi-piece type including two or more cover layers. The solid golf ball of the present invention, however, is required to have a cover layer made from a specific cover material to be described later, irrespective of the type. According to the present invention, particularly, from the viewpoint of effectively achieving the effect of improving a golf ball, the golf ball may be of a two-piece solid golf ball.

The cover of the golf ball of the present invention is made from a cover material mainly containing an ionomer resin. To improve the resilience, the ionomer resin is required to be composed of an Li ion neutralized ionomer resin and a Mg ion neutralized ionomer resin. In this case, the mixing ratio in mass between the Li ion neutralized ionomer resin and the Mg ion neutralized ionomer resin may be set in a range of 95:5 to 10:90, preferably, 90:10 to 30:70. If the mixing ratio is out of the above range, it may fail to improve the resilience.

As the above ionomer resin, there can be used a commercial product, for example, "Surlyn 6320 or 7930" (Du Pont DE NEMOURS & COMPANY, USA).

The cover material of the present invention is required to contain an inorganic filler. The specific gravity of the inorganic filler may be set in a range of 3.50 or more, preferably, 3.60 or more, more preferably, 3.70 or more, with the upper limit being in a range of 20.0 or less, preferably, 10.0 or less, more preferably, 7.5 or less. If the specific gravity is excessively small, it fails to improve the durability.

The content of the inorganic filler may be set, on the basis of 100 parts by mass of the ionomer resin, in a range of 10 parts by mass or more, preferably, 11 parts by mass or more, more preferably, 12 parts by mass or more, with the upper limit being in a range of 25 parts by mass or less, preferably, 24 parts by mass or less, more preferably, 23 parts by mass or less. If the content is excessively small, it fails to improve the durability, and if excessively large, the resilience and the moldability may be reduced.

Examples of the inorganic fillers may include barium sulfate and titanium dioxide. Preferably, barium sulfate and titanium dioxide are used in combination.

According to the present invention, the specific gravity of the cover material is required to be adjusted in a range of 1.020 or more, preferably, 1.030 or more, more preferably, 1.040 or more, with the upper limit being in a range of 1.110 or less, preferably, 1.090 or less. With such adjustment, it is possible to improve the durability and suppress reduction in the resilience due to excessive addition of the inorganic filler.

In addition, a UV absorbent, an oxidation inhibitor, a dispersant, and a coloring agent may be added to the cover material, as needed.

The cover of the golf ball of the present invention can be formed by a known process of putting the solid core in a specific mold for injection molding, and injection-molding the cover material. Alternatively, the cover can be formed by preparing a pair of cup-halves made from the cover material, putting the solid core covered with the cup-halves in a specific mold, and press-molding the resultant solid core covered with the cup-halves.

The Shore D hardness of the cover of the golf ball of the present invention may be set in a range of 55 or more, preferably, 56 or more, more preferably, 57 or more, with the upper limit being in a range of 65 or less, preferably, 64 or less, more preferably, 63 or less. In this way, the cover of the golf ball is relatively harder than a cover of a general golf ball; however, the cover can exhibit desirable resilience while keeping high durability against cracking. If the hardness is higher than the above range, player's feeling of hitting the ball is degraded, and if lower than the above range, the resilience is reduced.

In spite of the type of the golf ball, that is, a two-piece solid golf ball or a multi-piece solid golf ball (in this case, the thickness of a cover is the total thickness of cover layers), the thickness of the cover may be set in a range of 1.0 mm or more, preferably, 1.2 mm or more, with the upper limit being in a range of 1.3 mm or less, preferably, 2.0 mm or less, more preferably, 1.9 mm or less. If the cover is excessively thick, player's feeling of hitting the ball may be degraded.

Like a general golf ball, the golf ball of the present invention has in the cover surface a large number of dimples. These dimples are required to be optimized for obtaining a desirable carry of the ball by preventing the drop of the ball.

The optimization of the dimples will be described with reference to FIG. 1. FIG. 1 is an enlarged sectional view of one dimple illustrating the definition of a VR (Volume Ratio) of dimples according to the present invention. In the figure, the right and left top points E at the edge portion of the dimple are horizontally positioned, and the deepest portion of the dimple having a maximum depth De is located at the center of the dimple.

To be more specific, the top points E are defined as points at which a dimple diameter Di crosses a circle formed by the edge portion of the dimple, and the maximum depth De is defined as a distance from a line connecting the points E to each other to the deepest portion of the dimple. Each dimple volume V is defined as a volume of the dimple space present under the plane surface surrounded by the edge portion of the dimple.

According to the present invention, the dimples are optimized by specifying a dimple total volume ratio (VR) in a range of 0.85% or less, preferably, 0.84% or less, more preferably, 0.83% or less. The dimple total volume ratio (VR) is defined as a ratio of a total volume of dimple spaces each of which is present under a plane surface surrounded by an edge portion of the dimple to a total volume of a virtual ball being the same as the golf ball except that the virtual ball has no dimples. With this optimization of the dimples, it is possible to prevent the drop of the hit ball, and hence to improve the carry of the ball.

The volume V of each dimple can be measured, for example, by a measurement apparatus described in Japanese Patent Laid-open No. Hei 11-30508. If the dimples are not optimized as described above, the hit ball may be dropped, to reduce the carry of the ball. In addition, there is no limitation to the total number, kinds, shape, and the like of the dimples. For example, the total number of the dimples may be set in a range of 350 pieces or more, preferably, 370 pieces or more, with the upper limit being in a range of 500 pieces or less, preferably, 480 pieces or less. The kinds of the dimples may be set in a range of two or more, preferably, three or more. The shape of each dimple is not limited to the circular shape, and the diameter of each dimple may be set in a range of 2.0 mm or more, preferably, 2.2 mm or more, with the upper limit being in a range of 5.0 mm or less, preferably, 4.8 mm or less.

The golf ball of the present invention can be produced with its diameter and weight specified under a golf rule for golf games. Concretely, the diameter of the golf ball can be set in a range of 42.67 mm or more, with the upper limit being in a range of 44.0 mm or less, preferably, 43.5 mm or less, more preferably, 43.0 mm or less, and the weight of the golf ball can be set in a range of 45.93 g or less, with the lower limit being in a range of 44.5 g or more, preferably, 44.8 g or more, most preferably, 45.0 or more.

As described above, the present invention can provide a golf ball with high durability and very high resilience.

EXAMPLES

The present invention will be more clearly understood by way of, while not limited thereto, the following examples and comparative examples.

Examples 1 to 3 and Comparative Examples 1 and 2

A rubber composition for a solid core was prepared by mixing respective core components with 100 parts by mass of polybutadiene (BR11, BR18, sold by Japan Synthetic Rubber Co., Ltd.) as shown in Table 1, and a solid core was produced from the rubber composition. In Table 1, "Percumyl D" (sold by NOF CORPORATION) was used as dicumyl peroxide, and NOCRAK NS-6 (sold by Ouchi-Sinko Chemical Industrial Co., Ltd.) was used as an antioxidant.

A cover material having a composition shown in Table 1 was prepared, and physical properties thereof were examined. Commercial products used for the cover material and methods of measuring the physical properties of the cover material are as follows:

Surlyn
This is an ionomer resin sold by Du Pont DE NEMOURS & COMPANY, USA. A metal name in each parenthesis designates a metal ion type used for neutralization.

Himilan
This is an ionomer resin sold by Du Pont-Mitsui Polychemicals Co., Ltd. A metal name in each parenthesis designates a metal ion type used for neutralization.

Shore D Hardness
The hardness not on the surface of the ball but on the surface of the resin sheet was measured under JIS-K 6253 by using a duro-meter of Type D under ASTM D2240.

Specific Gravity
The specific gravity of the sheet-shaped cover material was measured by using a specific gravity meter.

Thickness of Cover
The thickness of the cover was calculated on the basis of a relationship of (outer diameter of ball—outer diameter of core)/2.

Outer Diameter of Ball
The outer diameter of the ball at a portion with no dimple was measured.

Dimple VR
The dimple total volume ratio (VR) was determined by measuring each dimple volume in accordance with an apparatus and a method disclosed in Japanese Patent Laid-open No. Hei 11-30508.

Durability of Ball
Each ball was hit against a steel plate at a speed of 55 m/s, and the number of cracking was measured. The durability of the ball was expressed in an index, which was the number of cracking on the basis (100) of the number of cracking of a commercial two-piece solid golf ball (PRECEPT MC LADY, sold by Bridgestone Sports Co. Ltd.).

Flexural Amount Measured by Applying Load of 980 N
The flexural amount (mm), that is, deformed amount (mm) of each of the solid core and ball at the time of applying a load of 980 N (100 kg) thereto was measured.

Physical Properties of Golf Ball
The ball was hit with a swing robot (Miyamae Co. Ltd.), to which a driver (PRO230Titan, sold by Bridgestone Sports Co., Ltd.) was mounted, at a head speed of 40 m/s, and the carry (total) of the ball was measured. The initial velocity and spin of the ball immediately after hitting were measured by using a high-speed camera.

TABLE 1

|  |  |  | Example | | | Comparative Example | |
|---|---|---|---|---|---|---|---|
|  |  |  | 1 | 2 | 3 | 1 | 2 |
| Core | Composition (parts by mass) | Polybutadiene BR11 | 70 | 70 | 70 | 70 | 70 |
|  |  | Polybutadiene BR18 | 30 | 30 | 30 | 30 | 30 |
|  |  | Zinc acrylate | 26.2 | 26.1 | 26.2 | 25.8 | 22.7 |
|  |  | Zinc oxide | 5.0 | 5.0 | 5.0 | 5.0 | 5.0 |
|  |  | Barium sulfate | 10.1 | 12.8 | 10.1 | 18.0 | 10.2 |
|  |  | Zinc salt of pentachrolophenol | 1.0 | 1.0 | 1.0 | 1.0 | 0.0 |
|  |  | Antioxidant | 0.1 | 0.1 | 0.1 | 0.1 | 0.1 |
|  |  | Dicumyl peroxide | 1.4 | 1.4 | 1.4 | 1.4 | 1.4 |
|  | Outer diameter (mm) |  | 39.1 | 39.2 | 39.1 | 39.0 | 39.1 |
|  | Weight (g) |  | 35.1 | 35.8 | 35.1 | 36.3 | 34.8 |
|  | Hardness (mm) |  | 4.9 | 4.8 | 4.9 | 4.8 | 4.9 |
| Cover | Composition (parts by mass) | Surlyn 7930 (Li) | 66 | 66 | 66 |  |  |
|  |  | Surlyn 6320 (Mg) | 34 | 34 | 34 |  |  |
|  |  | Himilan 1557 (Zn) |  |  |  | 52 |  |
|  |  | Himilan 1601 (Na) |  |  |  | 48 |  |
|  |  | Himilan 1605 (Na) |  |  |  |  | 82 |
|  |  | Surlyn 9320 (Zn) |  |  |  |  | 18 |
|  |  | Barium sulfate | 15 | 8 | 15 |  | 22 |
|  |  | Titanium dioxide | 5 | 5 | 5 | 5 | 5 |
|  |  | Magnesium stearate | 1 | 1 | 1 | 1 | 1 |
|  |  | Pigment | 0.05 | 0.05 | 0.05 | 0.05 | 0.05 |
|  | Shore D hardness |  | 60 | 59 | 60 | 59 | 60 |
|  | Specific gravity |  | 1.090 | 1.040 | 1.090 | 0.980 | 1.140 |
|  | Thickness (mm) |  | 1.8 | 1.8 | 1.8 | 1.8 | 1.8 |
| Dimple | Number (piece) |  | 432 | 392 | 392 | 432 | 392 |
|  | VR (%) |  | 0.77 | 0.78 | 0.78 | 0.77 | 0.78 |

TABLE 1-continued

|     |     | Example | | | Comparative Example | |
| --- | --- | --- | --- | --- | --- | --- |
|     |     | 1 | 2 | 3 | 1 | 2 |
| Ball | Outer diameter (mm) | 42.7 | 42.7 | 42.7 | 42.7 | 42.7 |
|      | Weight (g) | 45.0 | 45.0 | 45.0 | 45.2 | 45.1 |
|      | Hardness (mm) | 4.0 | 3.9 | 4.0 | 3.9 | 4.0 |
|      | Durability | 110 | 105 | 110 | 55 | 125 |
|      | Initial speed (m/s) | 56.7 | 56.8 | 56.7 | 56.8 | 56.0 |
|      | Spin (rpm) | 2410 | 2450 | 2430 | 2470 | 2420 |
|      | Carry (m) | 202.7 | 201.4 | 201.1 | 202.9 | 197.6 |

As is apparent from the results shown in Table 1, each of the golf balls in Examples 1 to 3 exhibits high durability and very high resilience. On the contrary, each of the golf balls in Comparative Examples 1 and 2 exhibits the following disadvantages:

Comparative Example 1

The ball using a usual cover material is good in resilience and carry; however, since the cover material does not contain barium sulfate, the golf ball is much worse in durability, and therefore, is not usable.

Comparative Example 2

The ball using the cover material containing barium sulfate is good in durability; however, since the added amount of the whole inorganic filler is excessively large, the kinds of the ionomer resins are different from those specified according to the present invention, and the core is made from the material containing no organic sulfur compound, the ball is excessively low in resilience, thereby failing to obtain a long carry of the ball.

While the preferred embodiments of the present invention have been described using specific terms, such description is for illustrative purpose only, and it is to be understood that changes and variations may be made without departing from the spirit or scope of the following claims.

What is claimed is:

1. A golf ball comprising:
  a core made from a rubber composition containing polybutadiene as a main rubber component and also an organic sulfur compound; and
  a cover made from a cover material mainly containing an ionomer resin composed of an Li ion neutralized type ionomer resin and a Mg ion neutralized ionomer resin, and also an inorganic filler having a specific gravity of 3.50 or more;
  wherein a flexural amount of said core, measured by applying a load of 980 N thereto, is in a range of 4.0 to 5.5 mm; and
  a specific gravity of said cover material is in a range of 1.020 to 1.110, and a Shore D hardness of said cover is in a range of 55 to 65.

2. A golf ball according to claim 1, wherein a flexural amount of said golf ball, measured by applying a load of 980 N thereto, is in a range of 3.2 to 4.5 mm.

3. A golf ball according to claim 1, wherein said inorganic filler contains at least barium sulfate, and a content of said inorganic filler is in a range of 10 to 25 parts by mass on the basis of 100 parts by mass of said ionomer resin.

4. A golf ball according to claim 1, wherein a thickness of said cover is in a range of 1.0 to 2.0 mm.

5. A golf ball according to claim 1, wherein a content of said organic sulfur compound is in a range of 0.05 to 3.00 parts by mass on the basis of 100 parts by mass of said main rubber component.

6. A golf ball according to claim 1, wherein said golf ball has in the cover surface a large number of dimples; and
  a dimple total volume ratio (VR) is in a range of 0.85% or less,
  wherein said dimple total volume ratio (VR) is defined as a ratio of a total volume of dimple spaces each of which is present under a plane surface surrounded by an edge portion of said dimple, to a total volume of a virtual ball being the same as said golf ball except that said virtual ball has no dimples.

7. A golf ball according to claim 1, wherein a Shore D hardness of said cover is in a range of 55 to 60.

8. A golf ball according to claim 1, wherein a Shore D hardness of said cover is in a range of 55 to 59.

9. A golf ball according to claim 1, wherein the diameter of the solid core is 38.0 mm or more.

10. A golf ball according to claim 1, wherein the diameter of the solid core is 38.5 mm or more.

11. A golf ball according to claim 1, wherein the mixing ratio in mass between the Li ion neutralized ionomer resin and the Mg ion neutralized ionomer resin is set in a range of 95:5 to 10:90.

12. A golf ball according to claim 1, wherein the mixing ratio in mass between the Li ion neutralized ionomer resin and the Mg ion neutralized ionomer resin is set in a range of 90:10 to 30:70.

13. A golf ball according to claim 1, wherein said inorganic filler is the combination of barium sulfate and titanium dioxide.

* * * * *